July 4, 1939.   A. F. DITTMER   2,164,801
CORRECTIVE LENS SYSTEM
Filed Oct. 22, 1936
FIG.1 NORMAL EYE
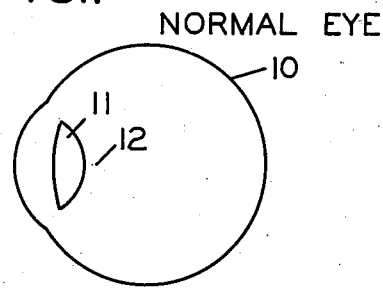
FIG.2 PRIOR ART
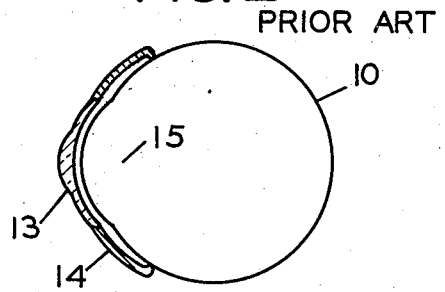
FIG.4
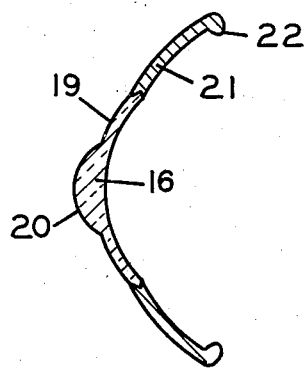
FIG.3
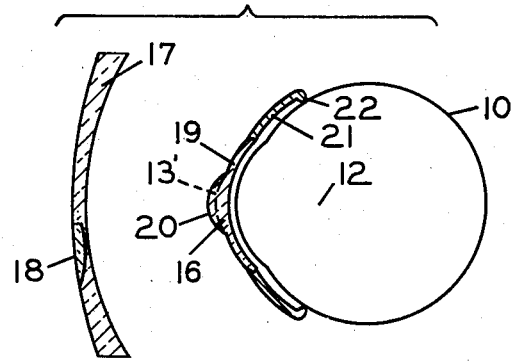
FIG.6
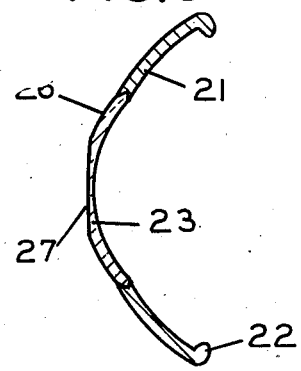
FIG.5
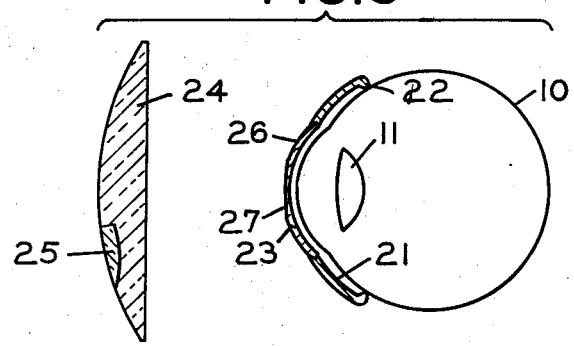
ARTHUR F. DITTMER
INVENTOR.
BY
ATTORNEYS Patented July 4, 1939

2,164,801

UNITED STATES PATENT OFFICE 2,164,801

CORRECTIVE LENS SYSTEM

Arthur F. Dittmer, Rochester, N. Y., assignor to Bausch & Lomb Optical Company, Rochester, N. Y., a corporation of New York Application October 22, 1936, Serial No. 107,009

2 Claims. (Cl. 88—54)

The present invention relates to lens systems and more particularly to compound lens system for correcting visual defects.

The outstanding difficulty encountered in the correction of unilateral aphakia arises from the great magnification (about 33 per cent) of the lens used to correct the refraction of the aphakic eye. This magnification prevents fusion and hence binocular vision and also introduces anomalies in the amount of rotation necessary when the aphakic eye turns in its socket to fixate on various points in the field of view. Previous attempts to overcome these anomalies have used reversed telescopic or minifying lenses before the aphakic eye, telescopic or magnifying lenses before the normal eye, or a combination of both systems. Both the reverse telescopic or minifying lenses and the telescopic or magnifying lenses present certain inherent objectionable features. They are unsightly, cumbersome, have a small field of view, are not adapted to multifocal additions and cannot correct both anomalies in unilateral aphakia.

One of the objects of the present invention is to provide a compound lens system which is light, has a large field of view and is adapted to multifocal additions. Another object is to provide a compound lens system in which one element is a contact lens adapted to be worn on the eye and the other element is an ordinary spectacle lens. A further object is to provide a compound lens system for correcting unilateral aphakia. A still further object is to provide a new and improved type of telescopic spectacle. These and other objects and advantages reside in certain novel features of construction, arrangement and combination of parts, as will hereinafter be more fully set forth and pointed out in the appended claims.

Referring to the drawing:

Fig. 1 is a schematic view of a normal eye.

Fig. 2 is a schematic view of an aphakic eye with a correcting contact lens in place.

Fig. 3 is a schematic view of a correcting lens system for an aphakic eye.

Fig. 4 is an enlarged sectional view of the contact lens shown in Fig. 3.

Fig. 5 is a schematic view of a telescopic lens system.

Fig. 6 is an enlarged sectional view of the contact lens shown in Fig. 5.

The difficulties and deficiencies of the prior art are illustrated in Figs. 1 and 2. Fig. 1 shows an eye 10 having the normal lens 11 and having its rear nodal point at 12. In Fig. 2, the eye 10 is aphakic and the refractive error due to the loss of the lens 11 is corrected by means of the contact lens 13 supported on the eye 10 by a scleral rim portion 14 of synthetic resin or the like. The contact lens 13 brings the nodal point forward to a point 15 and, while the image is now formed on the retina of the eye, the image is much larger than normal and hence fusion and binocular vision are impossible.

According to the present invention, the aphakic eye 10 is provided with a contact lens 16 having a curvature greater than that necessary to correct the visual deficiency of the eye 10, as indicated by the dotted line 13'. This additional power of the lens 16 makes the eye 10 slightly myopic. The optical combination of the eye 10 and contact lens 16 is then corrected in the usual way by an ordinary spectacle lens 17. The additional or overcorrecting power of the lens 16 and the spectacle lens 17 form a reverse telescopic or minifying lens system which compensates for the magnification of the correcting power of the lens 16 and pushes the nodal point of the eye and correcting lenses back to its normal position 12. The spectacle lens 17 can be made multifocal by the provision of a segment 18, and since the ocular or contact lens 16 moves with the eye 10, both the major portion of the lens 17 and the segment 18 can be used with equal facility.

Fig. 4 shows the preferred form of contact lens for use in this system. The lens 16 is formed with two curves 19 and 20 on its outer surface so that the lens 16 may have the desired power without being unduly thick and heavy. The lens 16 is secured in a scleral rim portion 21 of synthetic resin or the like, which has a flange 22 for contacting the eye. The contact lens 16 of itself forms no part of the present invention and is described in detail solely for the purpose of disclosing the best form known to the applicant for practicing his invention.

A telescopic lens system is illustrated in Fig. 5. In this system a negative contact lens 23 is worn on the eye 10 and a positive lens 24 is mounted in front of the eye 10 in the manner of the conventional spectacle lens. The lens 24 can be provided with a segment 25 to make the lens multifocal and the negative contact lens 23 can operate with either the distance portion of the lens 24 or the segment 25 with equal facility. In order to equalize the magnification across the whole area of the lens 24, it is sometimes necessary to make the lens 24 aspheric, that is, to depart from a true sphere and weaken the power of the lens 24 toward the edge.

As shown in Fig. 6, the contact lens 23 is of similar construction to that in Fig. 4. The lens 23 is provided on its front surface with the two curves 26 and 27. The curve 27 is much flatter than the curve 26 and gives the eye 10 a negative power. The structure of the scleral rim portion 21 is identical with that of Fig. 4.

From the foregoing, it will be apparent that I am able to attain the objects of my invention and provide a compound corrective lens system in which the rear lens is a contact lens and the front lens is an ordinary spectacle lens. A person whose eyes require the use of compound lenses is thus freed from the tubular mounts of the prior art and merely requires contact lenses and ordinary spectacle lenses with the resultant cosmetic improvement. Various modifications can, of course, be made without departing from the spirit of my invention or the scope of the appended claims.

I claim:

1. A lens system for correcting an aphakic eye comprising a contact lens adapted to be worn on the eye, said contact lens having power to correct the refractive error of the aphakic eye and move the nodal point of the combined eye and contact lens forward from its normal position, said contact lens having also an additional power, and a negative lens supported before the eye, the additional power of the contact lens and the negative lens combining to form a minifying system which returns the nodal point of the eye substantially to its normal position.

2. A lens system for correcting an aphakic eye comprising a contact lens adapted to be worn on the eye, said contact lens having a power greater than that necessary to correct the refractive errors of the aphakic eye, said contact lens having the effect of advancing the nodal point of the eye from its normal position, and a negative lens supported before the eye in spaced relation thereto, said negative lens neutralizing the power of the contact lens above that necessary to correct the refractive errors of the eye and returning the nodal point of the eye substantially to its normal position.

ARTHUR F. DITTMER.